US007735006B2

(12) United States Patent
Alexander et al.

(10) Patent No.: US 7,735,006 B2
(45) Date of Patent: Jun. 8, 2010

(54) METHOD AND SYSTEM FOR DEFINING PAGE SIZE WHEN DISPLAYING A DATA LIST

(75) Inventors: Geoffrey David Alexander, Chapel Hill, NC (US); David Kirk Grotjohn, Cary, NC (US); Jeremy Gray Perry, Cary, NC (US); Lucinio Santos-Gomez, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1272 days.

(21) Appl. No.: 11/250,673

(22) Filed: Oct. 14, 2005

(65) Prior Publication Data

US 2007/0089068 A1 Apr. 19, 2007

(51) Int. Cl.
*G06N 3/00* (2006.01)
(52) U.S. Cl. .................................................. 715/243
(58) Field of Classification Search ................ 715/200, 715/234, 243, 254
See application file for complete search history.

(56) References Cited

U.S. PATENT DOCUMENTS

| 4,889,439 | A | 12/1989 | Cook et al. ............... 400/706 |
| 5,553,217 | A | 9/1996 | Hart et al. ................. 395/148 |
| 5,717,941 | A | 2/1998 | Yoshida et al. ............ 395/787 |
| 5,781,785 | A | 7/1998 | Rowe et al. ............... 395/774 |
| 5,835,920 | A | 11/1998 | Horton ...................... 707/517 |
| 6,128,633 | A | 10/2000 | Michelman et al. ....... 707/525 |
| 6,173,286 | B1 | 1/2001 | Guttman et al. ........... 707/100 |
| 6,222,947 | B1 | 4/2001 | Koba ......................... 382/284 |
| 6,366,918 | B1 | 4/2002 | Guttman et al. ........... 707/100 |
| 6,636,648 | B2* | 10/2003 | Loui et al. ................. 382/284 |
| 6,844,940 | B2 | 1/2005 | Warmus et al. ........... 358/1.18 |
| 2004/0135838 | A1* | 7/2004 | Owen et al. ................. 347/19 |
| 2006/0059418 | A1* | 3/2006 | Elkady ...................... 715/508 |
| 2006/0282768 | A1* | 12/2006 | Mielke et al. ............. 715/517 |

* cited by examiner

*Primary Examiner*—Kyle R Stork
(74) *Attorney, Agent, or Firm*—Patents On Demand, P.A.; Scott M. Garrett (57) ABSTRACT

A system for setting data list parameters for displaying a data list in pages. An application program receives a first and second user input, wherein the first user input defines a number of items displayed within a page, and wherein the second user input defines a page size tolerance. In response to receiving the first and second user input, the application program sets the number of items displayed within the page and the page size tolerance. Then the application program displays the data list in a graphical user interface according to the set number of items displayed within the page and the set page size tolerance.

20 Claims, 10 Drawing Sheets

PAGE SIZE SET TO [10], TOLERANCE SET TO 2.

| NUMBER OF ITEMS IN THE LIST | STANDARD BEHAVIOR 504 | MAXIMIZED BEHAVIOR 506 | NORMALIZED BEHAVIOR 508 | USER SPECIFIED BEHAVIOR SET TO LAST [2] PAGES 510 |
|---|---|---|---|---|
| 20 | 2 PAGES: 10, 10 | 2 PAGES: 10, 10 | 2 PAGES: 10, 10 | 2 PAGES: 10, 10 |
| 21 | 3 PAGES: 10, 10, 1 | 2 PAGES: 10, 11 | 2 PAGES: 10, 11 | 2 PAGES: 10, 11 |
| 502 22 | 3 PAGES: 10, 10, 2 | 2 PAGES: 10, 12 | 2 PAGES: 11, 11 | 2 PAGES: 11, 11 |
| 23 | 3 PAGES: 10, 10, 3 | 3 PAGES: 10, 10, 3 | 3 PAGES: 10, 10, 3 | 3 PAGES: 10, 10, 3 |
| 24 | 3 PAGES: 10, 10, 4 | 3 PAGES: 10, 10, 4 | 3 PAGES: 10, 10, 4 | 3 PAGES: 10, 10, 4 |
| 25 | 3 PAGES: 10, 10, 5 | 3 PAGES: 10, 10, 5 | 3 PAGES: 10, 10, 5 | 3 PAGES: 10, 10, 5 |

FIG. 5A

PAGE SIZE SET TO [25], TOLERANCE SET TO 4.

| NUMBER OF ITEMS IN THE LIST | STANDARD BEHAVIOR 514 | MAXIMIZED BEHAVIOR 516 | NORMALIZED BEHAVIOR 518 | USER SPECIFIED BEHAVIOR SET TO LAST [2] PAGES 520 |
|---|---|---|---|---|
| 100 | 4 PAGES: 25, 25, 25, 25 | 4 PAGES: 25, 25, 25, 25 | 4 PAGES: 25, 25, 25, 25 | 4 PAGES: 25, 25, 25, 25 |
| 101 | 5 PAGES: 25, 25, 25, 25, 1 | 4 PAGES: 25, 25, 25, 26 | 4 PAGES: 25, 25, 25, 26 | 4 PAGES: 25, 25, 25, 26 |
| 102 | 5 PAGES: 25, 25, 25, 25, 2 | 4 PAGES: 25, 25, 25, 27 | 4 PAGES: 25, 25, 26, 26 | 4 PAGES: 25, 25, 26, 26 |
| 512 103 | 5 PAGES: 25, 25, 25, 25, 3 | 4 PAGES: 25, 25, 25, 28 | 4 PAGES: 25, 26, 26, 26 | 4 PAGES: 25, 25, 26, 27 |
| 104 | 5 PAGES: 25, 25, 25, 25, 4 | 4 PAGES: 25, 25, 25, 29 | 4 PAGES: 26, 26, 26, 26 | 4 PAGES: 25, 25, 27, 27 |
| 105 | 5 PAGES: 25, 25, 25, 25, 5 | 5 PAGES: 25, 25, 25, 25, 5 | 5 PAGES: 25, 25, 25, 25, 5 | 5 PAGES: 25, 25, 25, 25, 5 |

FIG. 5B

PAGE SIZE RANGE SET TO [10-12]. LAST PAGE ALWAYS HAS 3 OR MORE ITEMS.

| NUMBER OF ITEMS IN THE LIST | STANDARD BEHAVIOR 524 | MAXIMIZED BEHAVIOR 526 | NORMALIZED BEHAVIOR 528 | USER SPECIFIED BEHAVIOR SET TO LAST [2] PAGES 530 |
|---|---|---|---|---|
| 20 | 2 PAGES: 10, 10 | 2 PAGES: 10, 10 | 2 PAGES: 10, 10 | 2 PAGES: 10, 10 |
| 21 | 3 PAGES: 10, 10, 1 | 2 PAGES: 10, 11 | 2 PAGES: 10, 11 | 2 PAGES: 10, 11 |
| 22 | 3 PAGES: 10, 10, 2 | 2 PAGES: 10, 12 | 2 PAGES: 11, 11 | 2 PAGES: 11, 11 |
| 23 | 3 PAGES: 10, 10, 3 | 3 PAGES: 10, 10, 3 | 2 PAGES: 10, 10, 3 | 2 PAGES: 10, 10, 3 |
| 24 | 3 PAGES: 10, 10, 4 | 3 PAGES: 10, 10, 4 | 2 PAGES: 10, 10, 4 | 2 PAGES: 10, 10, 4 |
| 25 | 3 PAGES: 10, 10, 5 | 3 PAGES: 10, 10, 5 | 3 PAGES: 10, 10, 5 | 3 PAGES: 10, 10, 5 |

FIG. 5C

PAGE SIZE RANGE SET TO [25-29]. LAST PAGE ALWAYS HAS 5 OR MORE ITEMS.

| NUMBER OF ITEMS IN THE LIST | STANDARD BEHAVIOR 534 | MAXIMIZED BEHAVIOR 536 | NORMALIZED BEHAVIOR 538 | USER SPECIFIED BEHAVIOR SET TO LAST [2] PAGES 540 |
|---|---|---|---|---|
| 100 | 4 PAGES: 25, 25, 25, 25 | 4 PAGES: 25, 25, 25, 25 | 4 PAGES: 25, 25, 25, 25 | 4 PAGES: 25, 25, 25, 25 |
| 101 | 5 PAGES: 25, 25, 25, 25, 1 | 4 PAGES: 25, 25, 25, 26 | 4 PAGES: 25, 25, 25, 26 | 4 PAGES: 25, 25, 25, 26 |
| 102 | 5 PAGES: 25, 25, 25, 25, 2 | 4 PAGES: 25, 25, 25, 27 | 4 PAGES: 25, 25, 26, 26 | 4 PAGES: 25, 25, 26, 26 |
| 103 (532) | 5 PAGES: 25, 25, 25, 25, 3 | 4 PAGES: 25, 25, 25, 28 | 4 PAGES: 25, 26, 26, 26 | 4 PAGES: 25, 25, 26, 27 |
| 104 | 5 PAGES: 25, 25, 25, 25, 4 | 4 PAGES: 25, 25, 25, 29 | 4 PAGES: 26, 26, 26, 26 | 4 PAGES: 25, 25, 27, 27 |
| 105 | 5 PAGES: 25, 25, 25, 25, 5 | 5 PAGES: 25, 25, 25, 25, 5 | 5 PAGES: 25, 25, 25, 25, 5 | 5 PAGES: 25, 25, 25, 25, 5 |

800 d = Total Number of Items to be Displayed (dividend "d")
s = Number of Desired Items per Page (divisor "s")
t = Tolerance
r = the Remainder ("r" of the division between "d" and "s")
q = Number of full Pages (quotient "q" between )
p = Number of pages across which to spread the left over items. Can range between 1 and "q"
cp = Current page cp = q
If ( r ≤ t ) Then
While ( r > 0 )

Increase by 1 the Number of Items"s" displayed in page cp
    cp = cp - 1
    If ( (q - cp) = p ) Then cp = q
    r = r -1

Else: Create an additional Page to display the remaining items ("r" )

FIG. 8

METHOD AND SYSTEM FOR DEFINING PAGE SIZE WHEN DISPLAYING A DATA LIST

BACKGROUND OF THE INVENTION

1. Field of the Invention

The present invention relates generally to an improved data processing system. More specifically, the present invention is directed to a computer implemented method, apparatus, and computer usable program code for distributing data list items across multiple pages when display of the data list requires more than one page.

2. Description of the Related Art

A graphical user interface (GUI) permits an end user to interact with a computer through the more intuitive operations of "point and click" on graphical display elements with a pointer controlled by a mouse or other user interface device. A mouse is typically employed by a user of a computer to interact with the computer's GUI. A "pointer" is an iconic image controlled by a mouse and is displayed on the computer's GUI for the user to visually select or manipulate icons, menus, and other types of graphical objects.

A popular way to present information to computer system users is via a GUI. A GUI is usually a component of a computer environment, which is provided by an operating system. However, an application program also may create a GUI by independently displaying objects on a screen for utilities provided by the operating system. In addition, a combination of the operating system and application program approaches also may be used to create a GUI.

Information or data is often presented to an end user in a GUI environment using a graphical user interface component known as a window. A window is a scrollable viewing area on a GUI and is generally rectangular in shape. Each window conveys information about an application program or other process executing in the computer. A window is the central way to provide information to, and receive information from, a user. Usually one or more active windows are present on a display screen at any given time.

The number of horizontal and vertical pixels rates display screens. For example, 1024×768 means that the display screen displays 1024 pixels in each row and there are 768 rows or lines. A pixel, or picture element, is the smallest addressable unit on the display screen.

Users of application programs, such as databases, e-mail, online shopping, search engines, and the like, are familiar with viewing windows containing returned results of data lists. Sometimes, users face a challenge with managing large lists of returned results. Often, the large list of returned results is displayed on more than one page. For example, the returned result may display 1-10 of 31 on a first page, 11-20 of 31 on a second page, 21-30 of 31 on a third page, and 31 of 31 on a fourth page.

Currently, returned result window views are configurable such that the page size is set to show a specific number of items per page. This current configurable page size window view may create returned result views that contain relatively few items on the last page, such as in the example illustrated above, the fourth or last page of the returned result data list contains only 1 item. In the case of the depicted example above, the user may not want to waste time by viewing a page containing only 1 item because the user may feel that the effort/reward ratio is too small. As a result of not viewing the last page containing 1 item, the user may miss important information.

A small number of items placed on the last page of a returned result data list are similar to placing the last line of a paragraph from a previous page at the top of the next page. In the publishing or printing industry this carry over of the last line of a paragraph to the next page is known as a "widow" because the widow stands alone. For reasons of efficiency, a widow is undesirable in print and is undesirable in viewing a data list of returned results.

BRIEF SUMMARY OF THE INVENTION

Embodiments of the present invention provide a method, apparatus, and computer usable program code for setting data list parameters for displaying a data list in pages. An application program receives a first and second user input, wherein the first user input defines a number of items displayed within a page, and wherein the second user input defines a page size tolerance. In response to receiving the first and second user input, the application program sets the number of items displayed within the page and the page size tolerance. Then the application program displays the data list in a graphical user interface according to the set number of items displayed within the page and the set page size tolerance.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
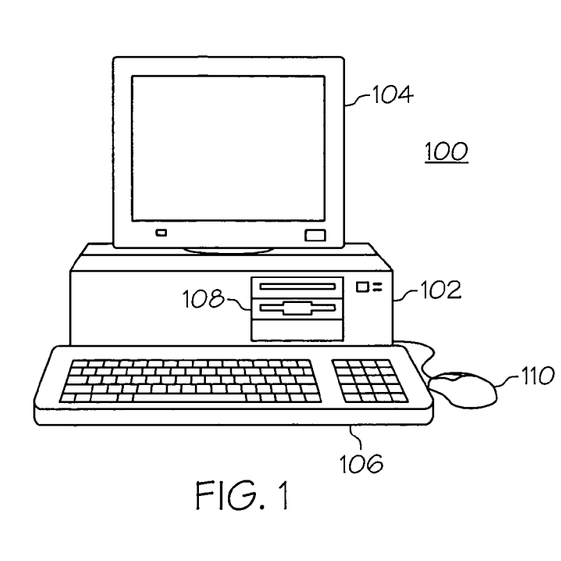
FIG. 1 is a pictorial representation of a data processing system in which the aspects of the present invention may be implemented.

With reference now to the figures and in particular with reference to FIG. 1, a pictorial representation of a data processing system is depicted in which the aspects of the present invention may be implemented. Computer 100 is shown that includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM® eServer™ computer or IntelliStation® computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
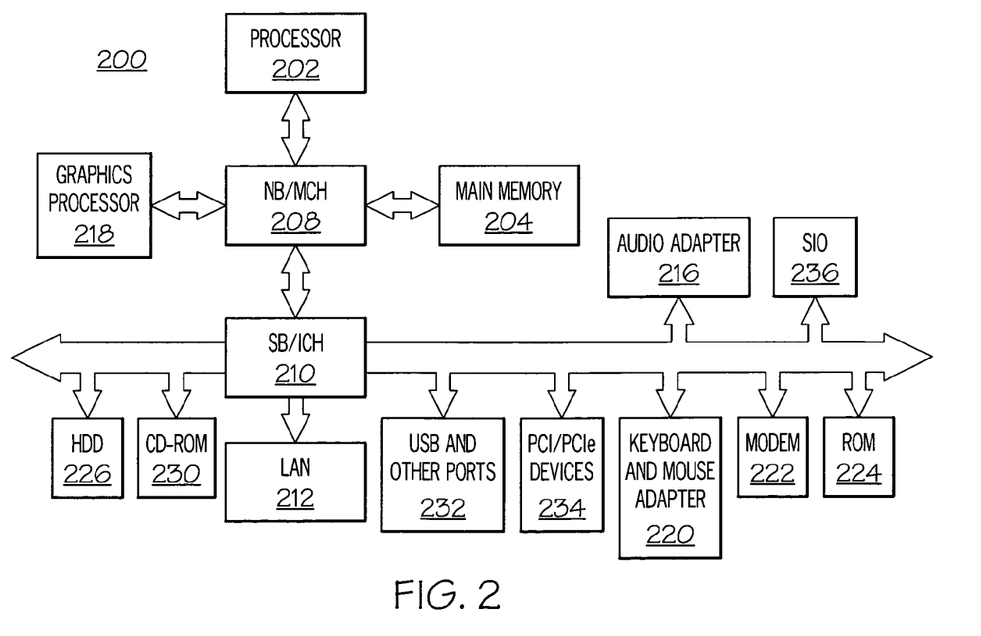
FIG. 2 is a block diagram of a data processing system in which aspects of the present invention may be implemented.

With reference now to FIG. 2, a block diagram of a data processing system is depicted in which aspects of the present invention may be implemented. Data processing system 200 is an example of a computer, such as computer 100 in FIG. 1, in which program code or instructions implementing the processes of the present invention may be located. In the depicted example, data processing system 200 employs a hub architecture including a north bridge and memory controller hub (NB/MCH) 208 and a south bridge and input/output (I/O) controller hub (SB/ICH) 210. Processor 202, main memory 204, and graphics processor 218 are connected to NB/MCH 208. Graphics processor 218 may be connected to the MCH through an accelerated graphics port (AGP), for example.

In the depicted example, local area network (LAN) adapter 212, audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to SB/ICH 210. PCI/PCIe devices may include, for example, Ethernet adapters, add-in cards, PC cards for notebook computers, etc. PCI uses a card bus controller, while PCIe does not. ROM 224 may be, for example, a flash binary input/output system (BIOS). HDD 226 and CD-ROM drive 230 may use, for example, an integrated drive electronics (IDE) or serial advanced technology attachment (SATA) interface. Super I/O (SIO) device 236 may be connected to SB/ICH 210.

An operating system runs on processor 202 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

Instructions for the operating system, the object-oriented programming system, and applications or programs are located on storage devices, such as HDD 226, and may be loaded into main memory 204 for execution by processor 202. The processes of embodiments of the present invention are performed by processor 202 using computer implemented instructions, which may be located in a memory such as, for example, main memory 204, read only memory 224, or in one or more peripheral devices.

Those of ordinary skill in the art will appreciate that the hardware in FIG. 1 and FIG. 2 may vary depending on the implementation. Other internal hardware or peripheral devices, such as flash memory, equivalent non-volatile memory, or optical disk drives and the like, may be used in addition to or in place of the hardware depicted in FIG. 1 and FIG. 2. Also, the processes of embodiments of the present invention may be applied to a multiprocessor data processing system.

As some illustrative examples, data processing system 200 may be a personal digital assistant (PDA), which is configured with flash memory to provide non-volatile memory for storing operating system files and/or user-generated data. A bus system may be comprised of one or more buses, such as a system bus, an I/O bus and a PCI bus. Of course, the bus system may be implemented using any type of communication fabric or architecture that provides for a transfer of data between different components or devices attached to the fabric or architecture. A communication unit may include one or more devices used to transmit and receive data, such as a modem or a network adapter. A memory may be, for example, main memory 204 or a cache such as found in NB/MCH 208. A processing unit may include one or more processors or CPUs. The depicted examples in FIG. 1 and FIG. 2 and above-described examples are not meant to imply architectural limitations. For example, data processing system 200 also may be a tablet computer, laptop computer, or telephone device in addition to taking the form of a PDA.

An embodiment of the present invention provides an improved computer implemented method, apparatus, and computer usable program code for displaying a data list in pages. An application program receives a user request to display the data list in pages in a GUI. In response to receiving the user request to display the data list, the application program displays a data list preference setting window in the GUI. Subsequent to displaying the data list preference setting window, the application program may receive a first user input to define the number of items displayed within a page and a second user input to define the page size tolerance.

The page size tolerance determines the minimum number of data list items that may be displayed on a last page of the data list. For example, if the user sets the page size tolerance to 2, then the application program will not display 2 data list items or less on the last page of the data list. The application program aggregates the 2 or fewer data list items that would have been displayed on the last page to previously full pages.

In addition, the page size tolerance also determines the maximum amount of page size increase to accommodate aggregation of extra data list items from the last page to previously full pages. For example, if the user sets the page size tolerance to 2, then the application program may increase the set number of data list items displayed per page up to a maximum of 2 in order to aggregate the extra data list items from the last page. Thus, the page size tolerance has a dual function of determining the minimum amount of data list items displayed on the last page of a data list and also determining the maximum amount of page size increase to accommodate aggregation of extra data list items from the last page.

A third user input may be received by the application program, which enables a behavior preference setting. The behavior preference setting may be a maximized, normalized, or user specified behavior. The maximized, normalized, and user specified behavior preference settings determine how aggregation of the extra data list items from the last page is accomplished. After the third user input enables the user specified behavior preference, the application program may receive a fourth user input that is associated with the third user input. The fourth user input defines the number of previously full pages across which the extra data list items from the last page are aggregated.

In response to receiving the user inputs, the application program sets the selected user preferences contained in the data list preference setting window. Then the application program displays the data list in the GUI according to the set user preferences. Alternatively, the application program may use a default setting for the purpose of displaying the data list if the user does not select a preference.

In the context of this specification, a user is anyone that may interact with the application program, such as, for example, the application program author, a system administrator, or an end user. In other words, the user may change or adjust any and all default settings or user preferences within the application program in accordance with embodiments of the present invention. A benefit of embodiments of the present invention is that the user now has the ability to set variable page sizes within parameters or limits. The user, by setting the desired parameters or limits, defines the minimum number of items to be displayed on the last page of the data list. The user, by defining the last page size parameter, avoids the annoyance of having only a few items listed on the last page. Thus, embodiments of the present invention decrease the user's efforts and improve the user's experience of viewing items in a data list.

Figure 3:
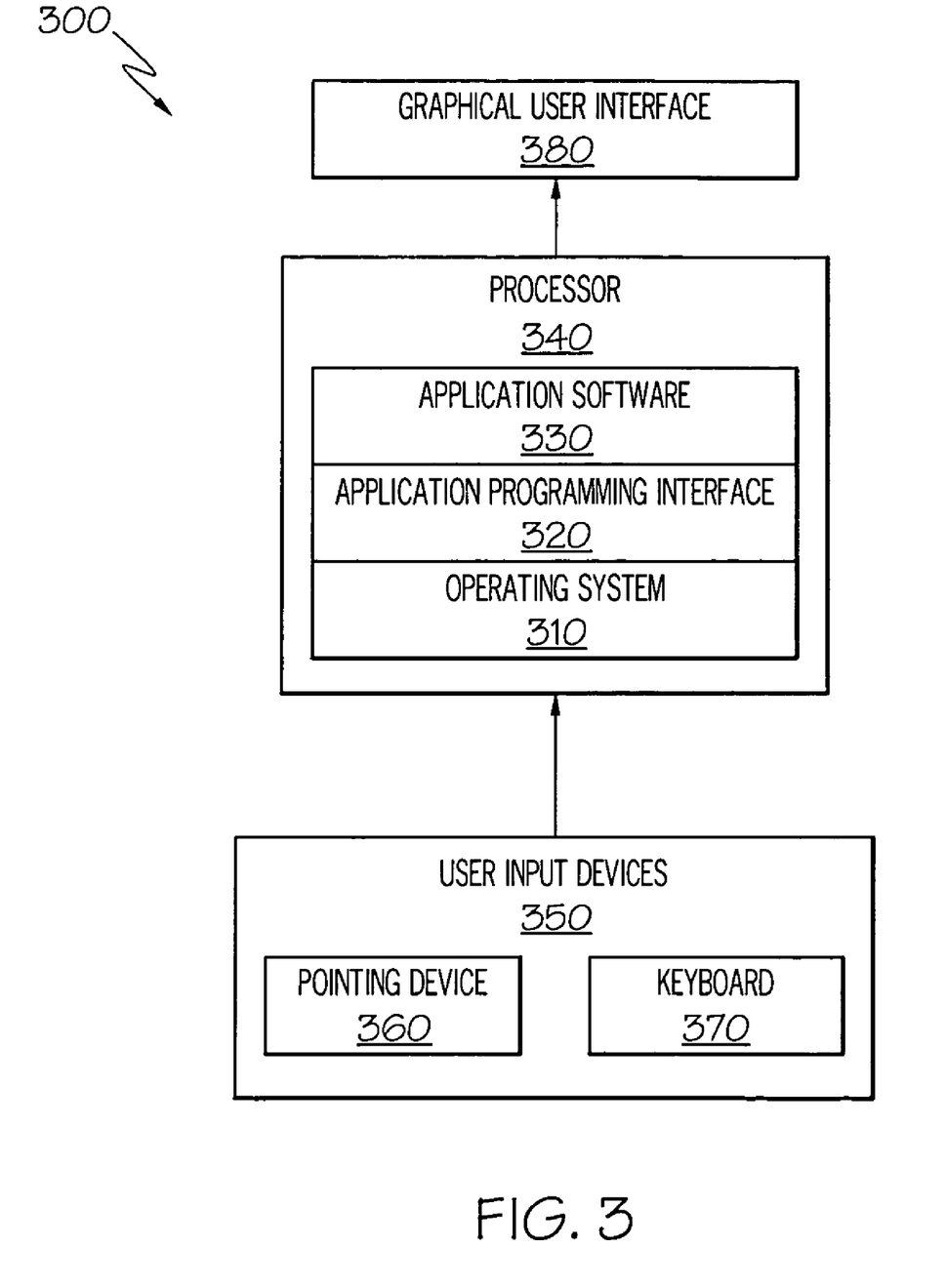
FIG. 3 is a block diagram of a data processing system in accordance with an embodiment of the present invention.

Referring now to FIG. 3, a block diagram of a data processing system in accordance with an embodiment of the present invention is shown. Data processing system 300 may be, for example, data processing system 200 in FIG. 2. Operating system 310, application programming interface 320, and application software 330 may reside, for example, in processor 340.

Operating system 310 is utilized to provide high-level functionality to the user and to other software. Such an operating system typically includes a basic input output system (BIOS). Application programming interface (API) 320 allows a user of data processing system 300, an individual, or a software routine, to invoke system capabilities using a standard consistent interface without concern for how the particular functionality is implemented. Application software 330 may run, for example, on operating system 310. Application software 330 represents any number of software applications designed to react to data to provide the desired functionality the user seeks. The software applications represented by application software 330 may include those software applications necessary to handle data, video, graphics, photos, or text. Embodiments of the present invention may be implemented within application software 330 in these examples.

Processor 340, such as, for example, processor 202 in FIG. 2, performs the basic operations in data processing system 300. Processor 340 may, for example, display information on graphical user interface (GUI) 380. GUI 380 has a plurality of picture elements, collectively referred to as a screen, which may define the appearance of a user interface environment displayed on GUI 380. GUI 380 screen contents and, therefore, the appearance of the user interface environment, may be controlled or altered by application software 330 or operating system 310 either individually or in combination.

Operating system 310, application software 330, or both, may employ user input devices 350 in order to obtain input from a user. User input devices 350 may include pointing device 360 and keyboard 370, such as, for example, mouse 110 and keyboard 106 in FIG. 1, or any other input device known to those of skill in the art. User input devices 350 may be used, for example, to set user preferences in a data list preference window displayed on GUI 380. However, embodiments of the present invention are not restricted to utilizing user input devices 350 for the sole purpose of setting user preferences. User input devices 350 may be used for any purpose necessary to accomplish the processes for different embodiments of the present invention.

Figure 4:
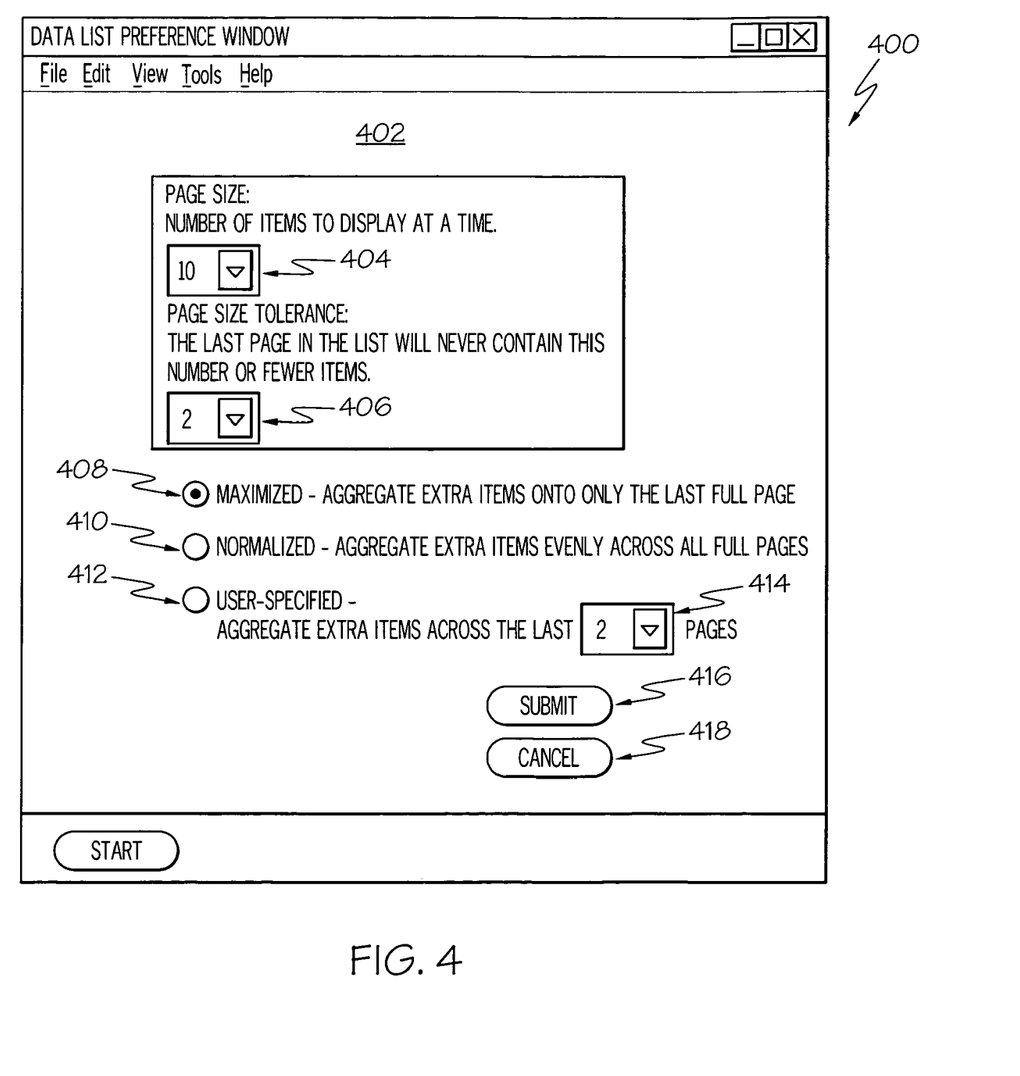
FIG. 4 is an exemplary illustration of a graphical user interface displaying a data list preference setting window in accordance with an embodiment of the present invention.

With reference now to FIG. 4, an exemplary illustration of a graphical user interface displaying a data list preference setting window is shown in accordance with an embodiment of the present invention. GUI 400, such as, for example, graphical user interface 380 in FIG. 3, displays data list preference setting window 402. A preference is an option in an application program that may be changed by the user. Preferences usually control the user interface, letting the user customize the way the user views data or information. Preferences also may control routine actions taken by the program. If the user does not select a preference setting, then the program may use a default setting.

A default setting is the current setting or action taken by hardware or software if the user has not specified otherwise. Application programs have dozens, if not hundreds, of default settings that determine everything from the font size that should be used to the folder a file is saved in. Defaults also imply that the setting or action may be changed.

Data list preference setting window 402 contains page size drop-down list 404 and tolerance drop-down list 406. A drop-down list, also known as a pop-down list or pull-down list is a common type of preference setting tool used with a GUI. Usually, a list title is displayed describing the preference setting drop-down list. The user, by using a user input device, such as user input devices 350 in FIG. 3, inputs the desired preference setting.

Page size drop-down list 404 sets the user preference for the number of items to be displayed on a data list page. Thus, page size drop-down list 404 defines the page size by limiting the number of items to be displayed per page. Page size drop-down list 404 may contain, for example, numbers from 5-100. However, embodiments of the present invention are not limited to the above listed range of numbers for page size drop-down list 404. Any range of numbers that are consistent with embodiments of the present invention may be utilized.

In this depicted example, the preference setting for page size drop-down list 404 is 10. In other words, by using the setting of 10 in page size drop-down list 404, the size of each page is limited to 10 items listed or displayed at a time. However, the user may select any number setting listed in page size drop-down list 404 as a preference setting by using, for example, a mouse to click-on page size drop-down list 404, scrolling down the number list, and selecting the desired number from the number list by clicking-on the desired number. In addition, the default setting for page size drop-down list 404 also may be, for example, 10.

Tolerance drop-down list 406 sets the user preference for the minimum number of items to be displayed on a last page of a data list. For example, if a data list contains more items than the page size set preference, but fewer extra data list items than the set page size tolerance, then the extra items in the data list are aggregated or added to the previous page or pages in reverse sequential page order. Reverse sequential page order means that the extra item or items are added to the last full page first, then to the second from the last full page, and so on.

Tolerance drop-down list 406 may contain, for example, numbers from 2-24. However, embodiments of the present invention are not limited to the above listed range of numbers for tolerance drop-down list 406. Any range of numbers that are consistent with embodiments of the present invention may be utilized. In this depicted example, the preference setting for tolerance drop-down list 406 is 2. In other words, the last page may not contain 2 or fewer items. However, the user may select any number setting listed in tolerance drop-down list 406 as a preference setting in the same manner described above for page size drop-down list 404. In addition, the default setting for tolerance drop-down list 406 also may be, for example, 2.

Data list preference setting window 402 also may contain radio buttons 408, 410, and 412. Radio buttons 408, 410, and 412 specify or define the number of full pages that the extra data list items may be distributed or aggregated across. Radio buttons are a series of on-screen buttons that allow only one selection. In other words, if a radio button is currently selected, the currently selected radio button is de-selected when another radio button is selected from the series. Radio button preference selection is utilized whenever the user may make only one choice out of several.

When a radio button contains a dot or mark, the preference function for that radio button is enabled, which means the preference is turned on and active. When the radio button is empty, the preference or option is disabled or not active. The user may use, for example, a mouse click to place a dot in the selected radio button. Performing a mouse click over the selected radio button enables that radio button preference function and disables all other radio button preference functions in the series. Consequently, embodiments of the present invention will contain a dot or mark in only one of radio buttons 408, 410, or 412 signifying that the preference function for radio button 408, 410, or 412 is enabled.

Radio button 408 sets the user preference for the program to maximize the number of aggregated extra data list items only onto the last full page up to a maximum page size tolerance limit. In other words, the last full page size may be increased over the page size preference limit set by page size drop-down list 404 by the page size tolerance preference number set by tolerance drop-down list 406. In this illustrative example, the last full page size may be increased from 10 to 12 for the purpose of aggregating extra data list items. Consequently, in this specific example, 12 is the maximum page size tolerance limit. Also, in this illustrative example radio button 408 contains a dot which signifies that the maximize preference is enabled. In addition, the maximize preference setting may be, for example, the program's default setting for radio button series 408, 410, and 412 as well.

Radio button 410 sets the user preference to normalize the number of data list extra items over one or more full pages. Normalization of the extra data list items means to distribute or aggregate the extra data list items as equally or evenly as possible over one or more full pages in reverse sequential page order up to the maximum page size tolerance limit. In other words, normalization tries to keep the number of items per page as close to the same as possible. Consequently, when a user selects normalize radio button 410, the extra data list items in the data list are aggregated as evenly as possible over one or more pages in reverse sequential page order as opposed to maximizing the number of items listed within the last full page up to the maximum page size tolerance limit when selecting maximize radio button 408.

Radio button 412 sets a user specified preference. This user specified preference defines how many full pages are utilized in reverse sequential page order to aggregate extra data list items. Associated with radio button 412 is drop-down list 414. Drop-down list 414 may only be enabled or utilized when the user selects user specified radio button 412. Drop-down list 414 specifies the number of pages the user desires to aggregate the extra data list items across.

Drop-down list 414 may contain, for example, numbers from 2-100. However, embodiments of the present invention are not limited to the above listed range of numbers for drop-down list 414. Any range of numbers that are consistent with embodiments of the present invention may be utilized. In this depicted example, the preference setting for drop-down list 414 is 2. In other words, the user specified in drop-down list 414 that only the last 2 full pages may be used to evenly aggregate extra data list items. However, the user may select any number setting listed in drop-down list 414 as a preference setting in the same manner described above for page size drop-down list 404. In addition, the default setting for drop-down list 414 also may be, for example, 2.

Consequently, by selecting user specified radio button 412, the user prefers to aggregate the extra data list items evenly across the last user specified number of full pages in reverse sequential page order. In this illustrative example, drop-down list 414 is set at 2, which means that the user desires to aggregate the extra data list items across the last two pages as equally as possible. In addition, 2 may be the program's default setting for drop-down list 414.

As a result, when the data list consists of more than one page of displayed items according to the page size set in page size drop-down list 404, but the number of extra data list items to be displayed on the last page is less than or equal to the page size tolerance set in drop-down list 406, the extra data list items are aggregated or added to the last full page or pages depending upon the page size tolerance setting and whether maximize radio button 408, normalize radio button 410, or user specified radio button 412 is marked. Also, it should be noted that if the user preferences or default settings of drop-down lists 404 and 406 are higher than the total number of data list items, the data list is displayed regardless of the total number of items.

Data list preference setting window 402 also may contain submit button 416 and cancel button 418. The user utilizes submit button 416 for the purpose of submitting the user's preferences to the application program. The user may, for example, employ a mouse click over submit button 416 to submit the data list user preferences. Alternatively, the user may elect to mouse click over cancel button 418. The user utilizes cancel button 418 in order to cancel the user's preferences selected in data list preference window 402. If the user cancels the user preferences, or if no user preferences are selected, the application program applies the default settings as the user preferences.

In an embodiment of the present invention, the application program may automatically display data list preference setting window 402 each time the application program is to display a data list on the GUI in order to obtain user data list preferences. Alternatively, data list preference setting window 402 may automatically appear only upon initial application program start-up for the user to set data list preferences. Or, the application program may use default settings until such time as the user selects user preference settings. The user may select data list preferences by, for example, mouse clicking on a tools menu and then mouse clicking on preferences, which causes data list preference window 402 to appear on the GUI.

In another embodiment of the present invention, the user may set a range of displayed items per page to define the page size instead of a single page size number. For example, the user may set the page size range at 10-12 items. The page size range means that each full page may display from 10 up to a maximum of 12 items. In addition, this page size range means that there is an inherent page size tolerance of 2. In this illustrative example, with an inherent page size tolerance of 2, the last page may not contain less than or equal to 2 items. Consequently, if the last page is to contain 2 or fewer items, then the 2 or fewer extra data list items are distributed over the previous page or pages within the set page size range.

In an alternative embodiment of the present invention, the page size and tolerance settings may be set in physical pixels. For example, if the page size preference is set at 500-pixels, page size tolerance is set at 60-pixels, and each data list item uses 20-pixels, then the page size is 25 items per page. The page size is calculated by dividing the 500-pixel page size by the 20-pixel item size, which equals the 25 items per page. The page size tolerance is calculated by dividing the 60-pixel page size tolerance by the 20-pixel item size, which equals a page size tolerance of 3 items. In other words, a page size tolerance of 3 allows the page size to expand from 25 to 28 data list items displayed per page in this illustrative example.

Turning now to FIGS. 5A-5D, exemplary illustrations of varying page sizes and page ranges are depicted in accordance embodiments of the present invention. FIGS. 5A-5D illustrate differences between standard behavior, maximized behavior, normalized behavior, and user specified behavior for data list page configurations. Standard data list configuration behavior represents current market behavior. Maximized, normalized, and user specified data list configuration behaviors represent varying embodiments of the present invention.

FIGS. 5A-5D are for illustration purposes only and are not meant to be limitations on embodiments of the present invention. Any page size, range, tolerance, or total number of items to be displayed may be utilized by embodiments of the present invention. In addition, in FIGS. 5A-5D the exemplary page size settings and page size tolerance settings may be user preference settings, default settings, or a combination of both.

Figure 5A:
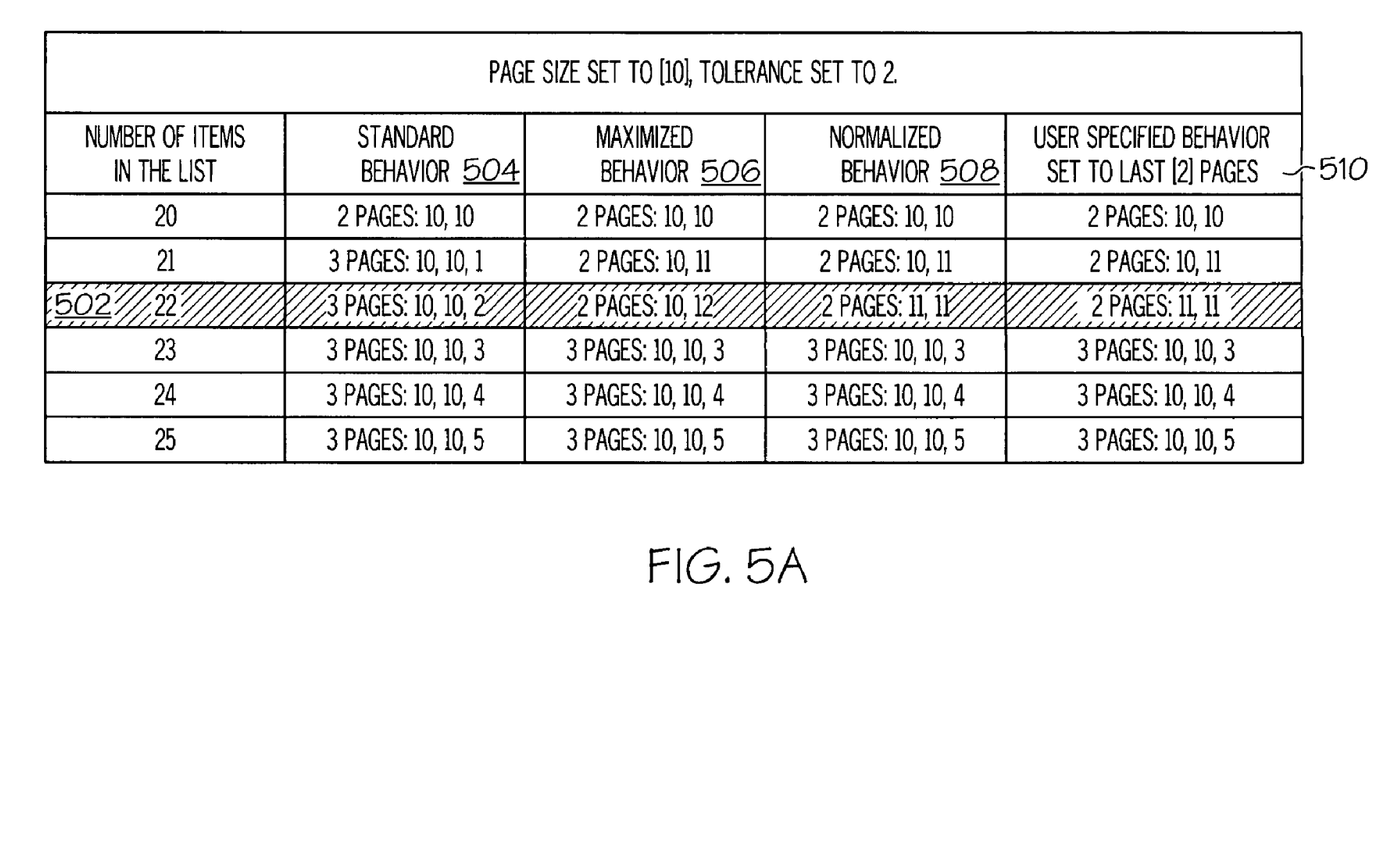
FIGS. 5A-5D are exemplary illustrations of varying page sizes and page ranges in accordance with embodiments of the present invention.

FIG. 5A is set to a page size of 10 data list items and a page size tolerance of 2. Total number of items in data list 502 is 22. Standard behavior 504 uses 3 pages to display data list 502 with a display configuration of 10 items on the first page, 10 items on the second page, and 2 items left over on the third page. Standard behavior 504 only takes into account the page size setting and not the page size tolerance setting. Thus, the 2 extra items remain on the last or third page of data list 502.

In contrast, the user may enable a maximize setting, such as maximize radio button 408 in FIG. 4, in order to display data list 502 according to the user's viewing preference. Maximized behavior 506 uses 2 pages to display data list 502 with a display configuration of 10 items on the first page and 12 items on the second page. It should be noted that in these particular examples described in FIG. 5A below, because the page size tolerance is set at 2, embodiments of the present invention will not display 2 items or less on a page unless there is only one page with 2 items or less in the data list. Consequently, the user by enabling the maximize setting views the 2 extra data list items on the last full page of maximized behavior 506 because the page size tolerance of 2 allows the page size to increase from 10 to 12 for the purpose of data list item aggregation to previously full pages. Thus, in this illustrative example the last full page is maximized to display 12 data list items.

Alternatively, the user may enable a normalize setting, such as normalize radio button 410 in FIG. 4. Normalized behavior 508 uses 2 pages to display data list 502, which is the same number of pages as maximized behavior 506. However, normalized behavior 508 has a display configuration of 11 items on the first page and 11 items on the second page. Thus, the 2 extra data list items are equally distributed over the 2 previously full pages.

On the other hand, the user may enable a user specified setting, such as user specified radio button 412 in FIG. 4. After enabling the user specified setting, the user selects from a drop-down list associated with the user specified setting, such as drop-down list 414 associated with user specified radio button 412 in FIG. 4, the number of pages the user desires to aggregate the extra data list items across. In this particular illustrative example, the user specified behavior is set to aggregate the extra data list items across the last 2 full pages, such as is shown in drop-down list 414 in FIG. 4. Accordingly, user specified behavior 510 uses 2 pages to display data list 502, with the 2 extra data list items evenly distributed over the 2 previously full pages. Thus, user specified behavior 510 has a display configuration of 11 items on the first page and 11 items on the second page, which is the same display configuration as normalized behavior 508 in this depicted example.

Figure 5B:
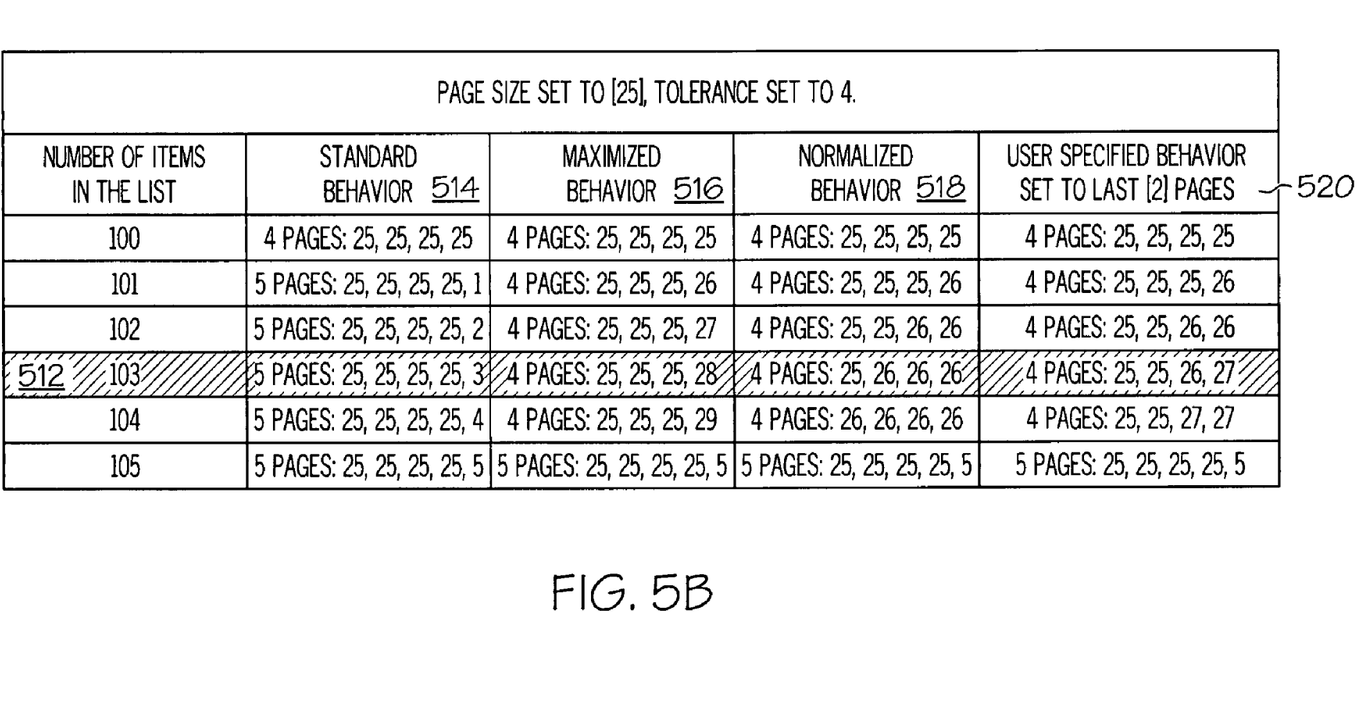

FIG. 5B illustrates a page size preference set to 25 and a page size tolerance set to 4. Total number of items in data list 512 is 103. Standard behavior 514 uses 5 pages to display data list 512 with a display configuration of 25 items on pages one through four and 3 items on page five. As noted above, standard behavior does not take into account the page size tolerance setting, only the page size setting. As a result, 3 items remain on the last page of the data list in standard behavior 514.

In contrast, maximized behavior 516 uses 4 pages to display data list 512 with a display configuration of 25 items on the first three pages and 28 items on the fourth page. Because the page size tolerance is set at 4 in FIG. 5B, embodiments of the present invention will not display 4 items or less on the last page of the illustrated examples below. Consequently, the last full page displays the 3 extra data list items of maximized behavior 516 because the page size tolerance is set to 4. With the page size tolerance set to 4, the page size may increase from 25 to 29 to allow for aggregation of data list items to previously full pages. Therefore, in this illustrative example the last full page is maximized to display 28 items.

Normalized behavior 518 uses 4 pages to display data list 512. The display configuration of normalized behavior 518 is 25 items on the first page and 26 items on pages two through four. Thus, the 3 extra data list items are evenly distributed or aggregated over three previously full pages in reverse sequential page order.

User specified behavior 520 also uses 4 pages to display data list 512. However, the display configuration of user specified behavior 520 is different from normalized behavior 518 in this depicted example. Because user specified behavior 520 is set to aggregate the extra data list items across the last 2 pages, the display configuration for user specified behavior 520 is 25 items on pages one and two, 26 items on page three, and 27 items on page 4. Consequently, in this particular example, the 3 extra items are aggregated as evenly as possible over the last 2 pages according to the user specified preference.

Figure 5C:
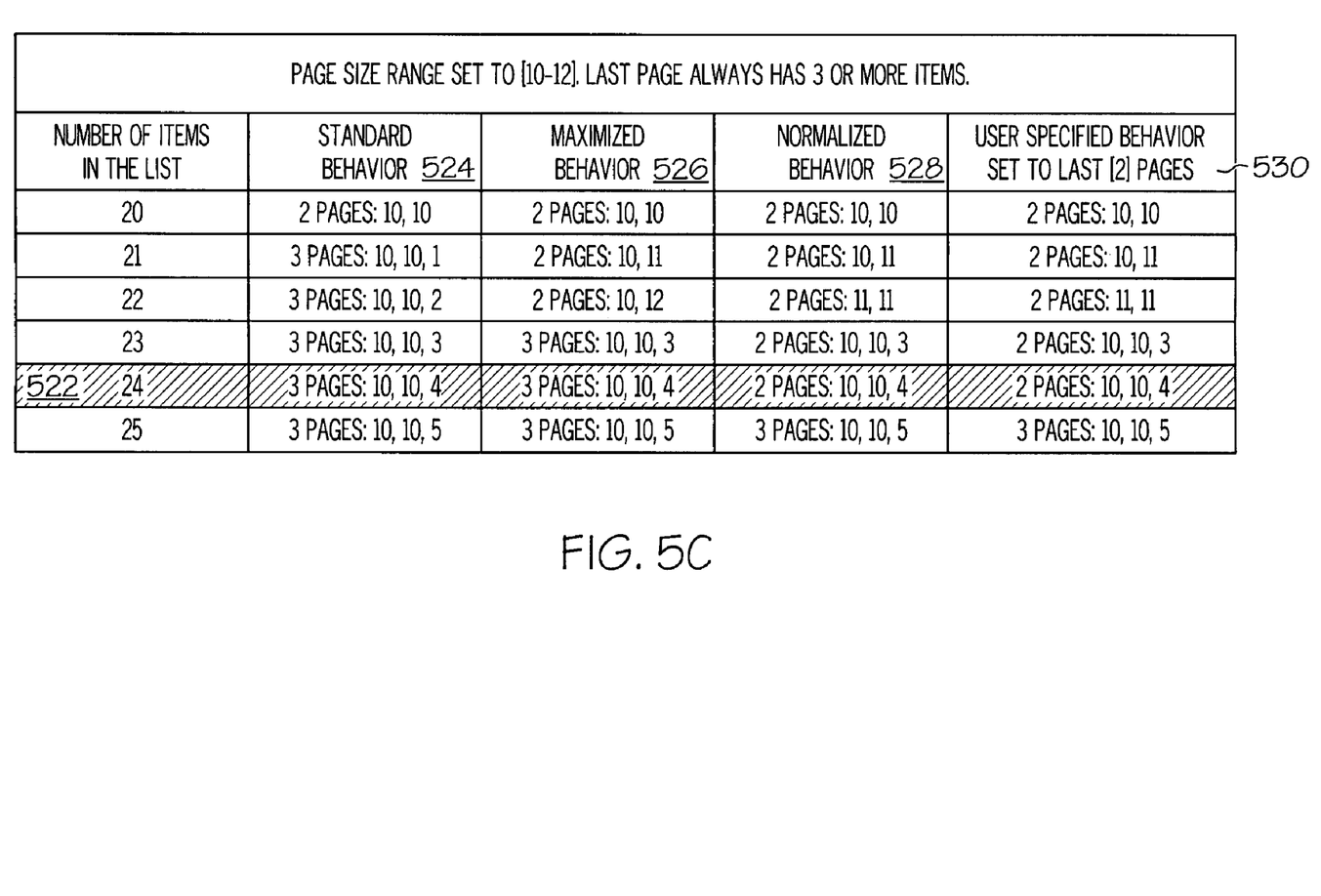

FIG. 5C illustrates a page size range set at 10-12 data list items. The user, by utilizing a page range setting, is not required to specify a page size tolerance because the page size tolerance is inherent in the page size range setting according to embodiments of the present invention. The inherent page size tolerance in this illustrative example is 2. Consequently, in this particular example the last page always displays 3 or more items.

The total number of items in data list 522 is 24. Standard behavior 524 uses 3 pages to display data list 522 with a display configuration of 10 items listed on pages one and two and 4 items listed on page three. Because embodiments of the present invention will display 3 items or more on the last page in these particular examples due to the inherent page size tolerance, maximized behavior 526, normalized behavior 528, and user specified behavior 530 all have the same number of pages and page display configuration as standard behavior 524.

Figure 5D:
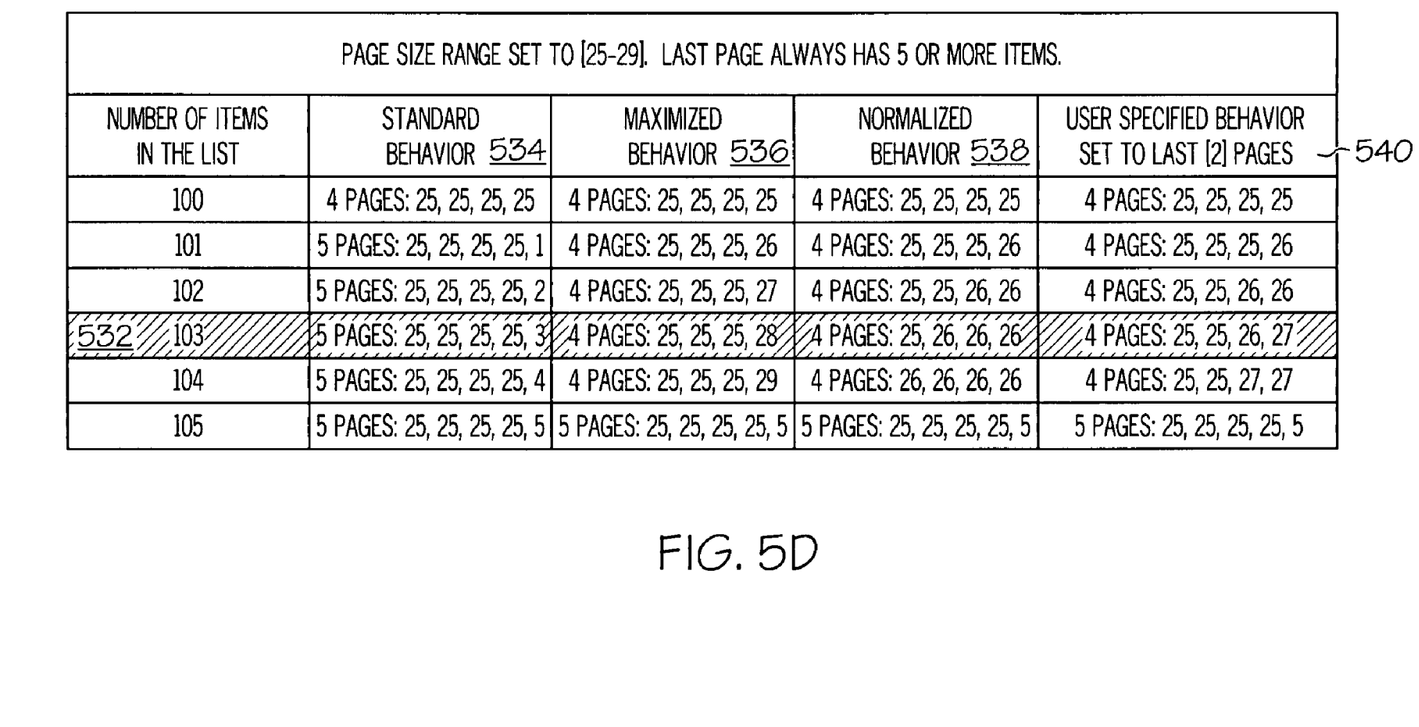

FIG. 5D illustrates a page size range set at 25-29. As noted above, the user setting a page range inherently sets a page size tolerance. The inherent page size tolerance in this illustrative example is 4. Consequently, embodiments of the present invention will always display 5 or more items on the last page in these particular examples due to the inherent page size tolerance.

Total number of items in the data list 532 is 104. Standard behavior 534 uses 5 pages to display data list 532 containing the 104 data list items with a display configuration of 25 items on pages one through four and 4 items on page five. Maximized behavior 536 uses 4 pages to display the data list with a configuration of 25 items listed on the first three pages and 29 items listed on the fourth page. Therefore, maximized behavior 536 maximizes the last full page to contain 29 data list items in accordance with the set page range of FIG. 5D.

Normalized behavior 538 also uses 4 pages to display data list 532. However, normalized behavior 538 utilizes a different page display configuration than maximized behavior 536. Normalized behavior 538 lists 26 data list items on all 4 pages. Thus, the 4 extra data list items, which are found on page 5 of standard behavior 528, are equally distributed over all of the previously full 4 pages.

User specified behavior 540 again uses 4 pages to display data list 532, but user specified behavior 540 uses yet another page display configuration that is different from both maximized behavior 536 and normalized behavior 538. The page display configuration for user specified behavior 540 lists 25 data list items on pages one and two and 27 data list items on pages three and four. This page display configuration in this illustrative example is a result of the user setting the user specified behavior to aggregate the extra data list items across the last 2 pages. Hence, only the last two pages are utilized for data list item aggregation in this specific example.

Figure 6:
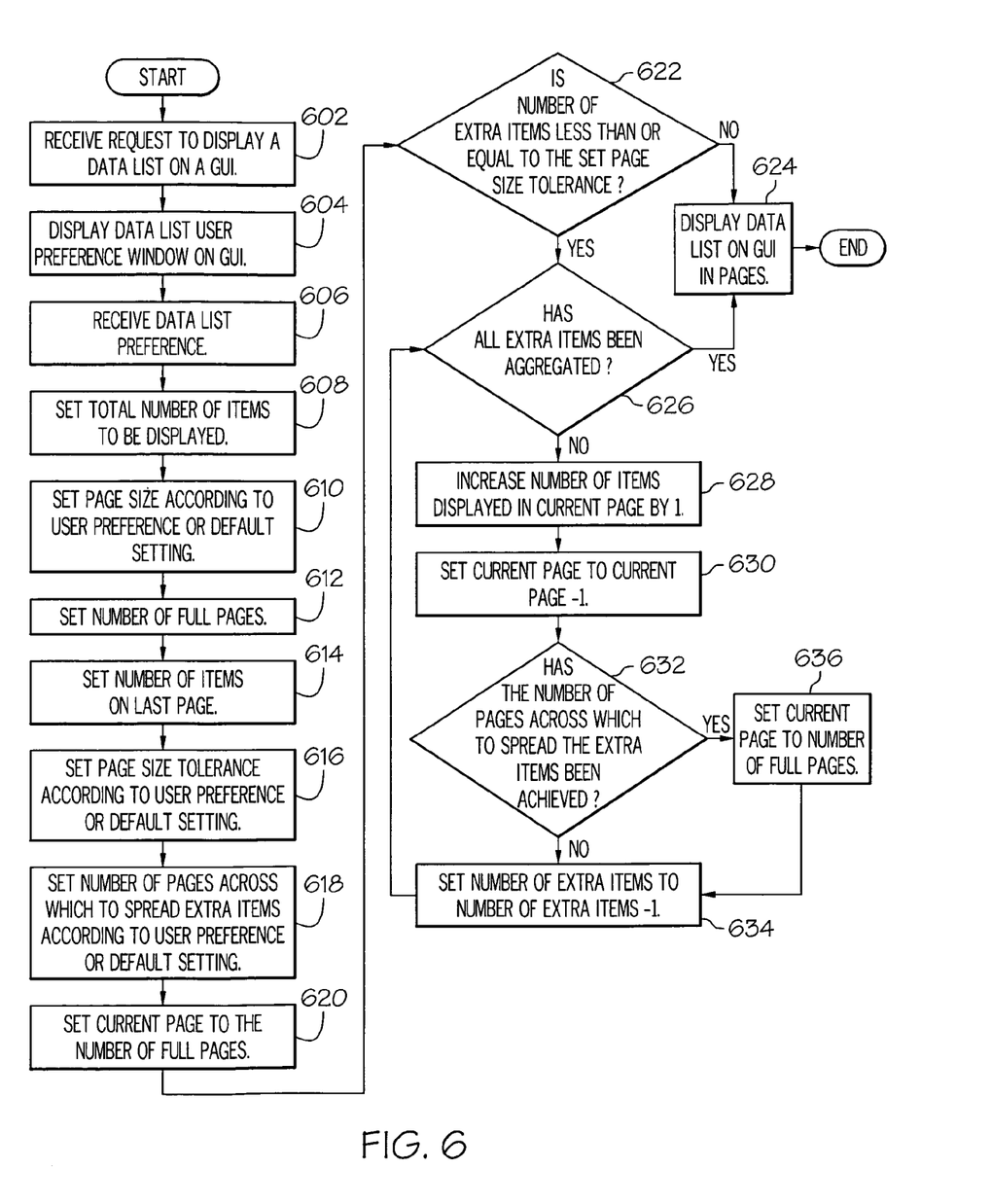
FIG. 6 is a flowchart illustrating an exemplary process for distributing data list items across multiple pages when display of the data list requires more than one page in accordance with an embodiment of the present invention.

Referring now to FIG. 6, a flowchart is shown illustrating an exemplary process for distributing data list items across multiple pages when display of the data list requires more than one page in accordance with an embodiment of the present invention. The process illustrated in FIG. 6 may be implemented in a computer, such as, for example, computer 100 in FIG. 1. More specifically, the process illustrated in FIG. 6 may be implemented in an application program contained within computer 100 in FIG. 1, such as, for example, application software 330 contained within data processing system 300 in FIG. 3.

The process begins when a user inputs a request, for example, via a mouse or keyboard, such as pointing device 360 or keyboard 370 in FIG. 3, to display a data list on a GUI (step 602). The data list may be contained within, for example, the application program itself, another application program contained within the computer, a database contained within or connected to the computer, an online resource connected to the computer, or any source that may provide data in a list format. The data list may be any compilation of data or information that the user desires to view in page form on a GUI.

Subsequent to receiving the user request to display the data list in step 602, the application program displays a data list user preference window, such as data list preference window 402 in FIG. 4, on the GUI for the user to input data list preferences (step 604). The user inputs the desired data list preferences, such as page size, page size tolerance, and maximize, normalize, or user specified behavior on the data list user preference window. For example, the user uses page size drop-down list 404 to input the desired number of data list items to display on each page, tolerance drop-down list 406 to input the desired page size tolerance, radio buttons 408, 410, or 412 to input maximize, normalize, or user specified behavior, and drop-down list 414 associated with user specified behavior 412 to input the number of pages across which the user desires to aggregate extra data list items in FIG. 4. The application program receives the data list preferences (step 606) and then proceeds to set the user preferences. In the absence of receiving a user preference input, the application program applies the default settings for displaying the data list.

After receiving the user input as to data list preferences in step 606, the application program determines and sets the total number of items in the data list to be displayed on the GUI (step 608). Then the application program sets the page size according to the user preference input or to the default settings (step 610). The page size is the number of data list items listed per page. Once the page size is set in step 610, the application program determines and sets the number of full pages by dividing the total number of data list items to be displayed by the set page size (step 612).

Subsequent to determining the number of full pages in step 612, the application program determines the number of extra data list items to be placed on a last page (step 614). The remainder of dividing the total number of items to be displayed by the set page size is the number of extra data list items to be placed on the last page. After determining the number of extra data list items to be displayed on the last page, the application program sets the page size tolerance according to the user preference input or default setting (step 616). The page size tolerance determines whether the extra data list items remain on a separate page by themselves or whether the extra data list items are aggregated to one or more previously full pages.

In addition, the page size tolerance also determines how much a page size may be increased in order to accommodate aggregation of extra data list items to previously full pages. For example, if the page size is set at 10 and the page size tolerance is set at 2, the page size may be increase from 10 to 12 if the number of extra data list items on the last page are less than or equal to 2. For example, maximized behavior 506 aggregates 2 extra data list items into a previously full last page in data list 502 of FIG. 5A. In this particular example, 12 is the maximum page size tolerance limit.

Further, the application program sets the number of pages the extra data list items may be aggregated across according to a user preference or to a default setting (step 618) and sets the current page to the number of full pages (step 620). Subsequently, the application program determines whether the number of extra data list items on the last page are less than or equal to the set page size tolerance (step 622). If the number of extra data list items is not less than or equal to the set page size tolerance, no output of step 622, then the application program displays the data list in pages on the GUI for the user to view (step 624). The process terminates thereafter.

If the number of extra data list items is less than or equal to the set page size tolerance, yes output of step 622, then the application program determines whether aggregation of all the extra data list items has occurred (step 626). If the application program has aggregated all of the extra data list items from the last page, yes output of step 626, then the process returns to step 624 where the application program displays the data list. If the application program has not aggregated all of the extra data list items from the last page, no output of step 626, then the application program increases the number of items displayed in the current page by 1 (step 628).

After the application program increases the number of items displayed in the current page by 1 in step 628, the application program sets the current page to the current page minus 1 (step 630). Once the number of items displayed in the current page is increased by 1 in step 628 and the current page is set to the previous page in step 630, the application program makes a determination as to whether the number of pages over which the extra data list items are to be aggregated has been achieved (step 632). If the number of pages over which the extra data list items are to be aggregated has not been achieved, no output of step 632, then the application program sets the number of extra data list items to the number of extra data list items minus 1. Thereafter, the process returns to step 626 where a determination is made as to whether all extra data list items have been aggregated. If the number of pages over which the extra data list items are to be aggregated is achieved, yes output of step 632, then the application program sets the current page to the number of full pages (step 636). The process returns to step 634 thereafter.

Figure 7:
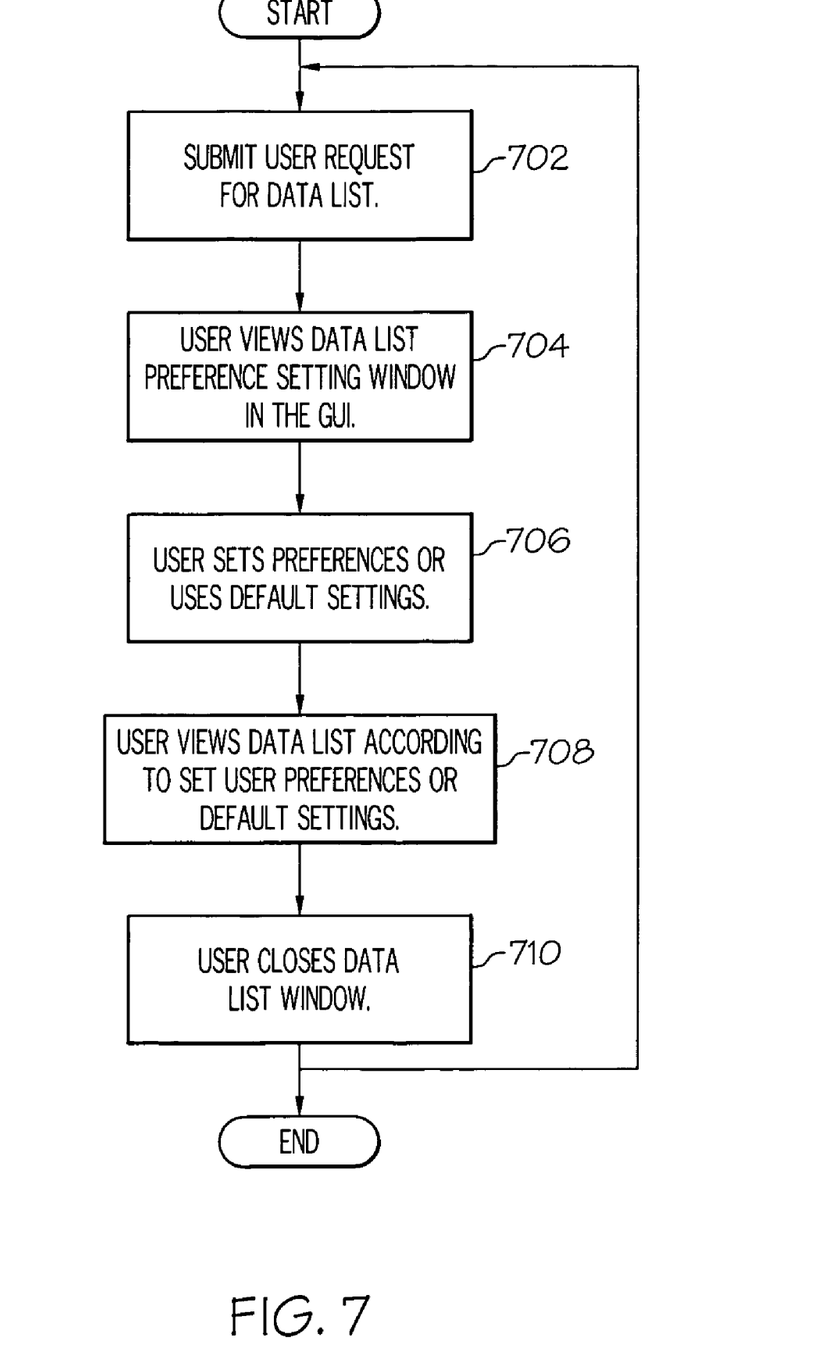
FIG. 7 is a flowchart illustrating an exemplary user process for viewing a data list in accordance with an embodiment of the present invention.

With reference now to FIG. 7, a flowchart is shown illustrating an exemplary user process for viewing a data list in accordance with an embodiment of the present invention. The process begins when a user submits a request, for example, via a mouse or keyboard, such as pointing device 360 or keyboard 370 in FIG. 3, to view a data list on a computer's GUI (step 702). After submitting the request to view the data list in step 702, the user views a data list preference setting window on the GUI, such as data list preference window 402 in FIG. 4 (step 704).

While viewing the data list preference setting window in step 704, the user inputs and then submits the user's preferences by, for example, using a mouse click over a submit button, such as submit button 416 in FIG. 4 (step 706). Alternatively, the user may cancel user preferences by mouse clicking over a cancel button, such as cancel button 418 in FIG. 4, in which case the application program applies the default settings for the data list parameters. Subsequent to inputting and submitting or canceling the user data list preferences in step 706, the user views the data list according to the set user preferences or applied default settings (step 708). After viewing the data list in the GUI in step 708, the user closes the data list window (step 710) and the process terminates thereafter. Alternatively, the user may return to step 702 by submitting another request for a data list. In addition, it should be appreciated by those skilled in the art that the application program may display a plurality of data list windows in the GUI at any one time.

Figure 8:
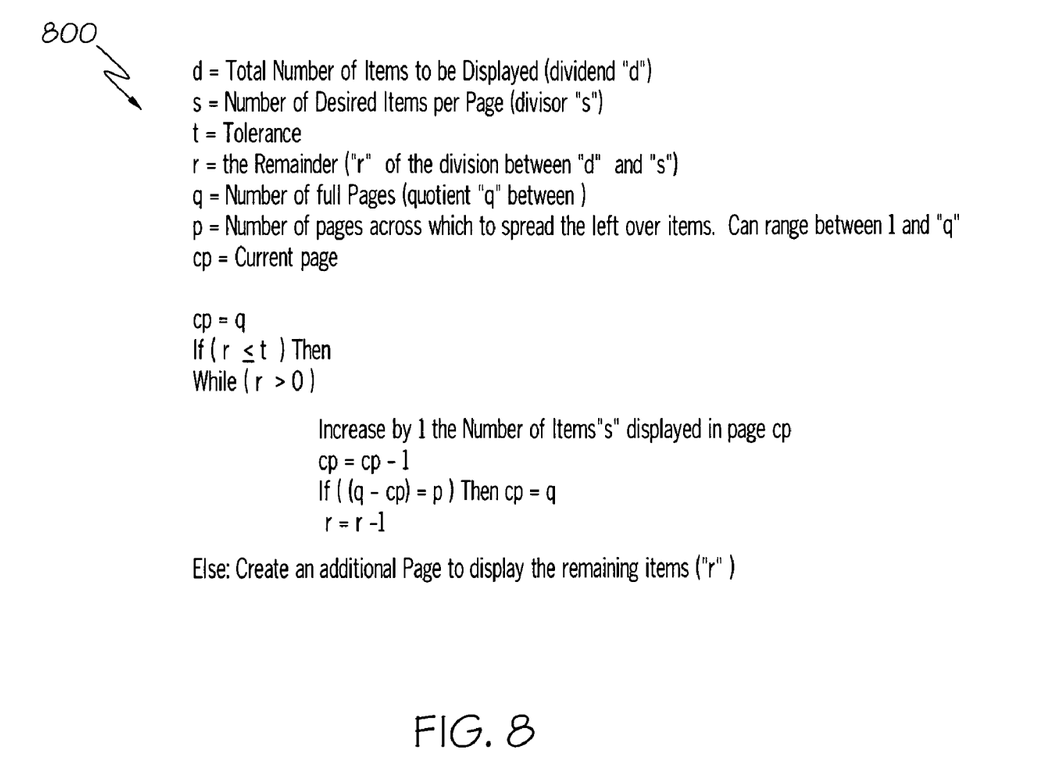
FIG. 8 is an exemplary algorithm for distributing data list items across multiple pages when display of the data list requires more than one page in accordance with an embodiment of the present invention.

Turning now to FIG. 8, an exemplary algorithm for distributing data list items across multiple pages when display of the data list requires more than one page is depicted in accordance with an embodiment of the present invention. A software programmer locates the algorithm for distributing data list items across multiple pages within the application program, such as application software 330 in FIG. 3. Algorithm 800 is presented only as an example of an algorithm that may be used by embodiments of the present invention to define data list parameters. Embodiments of the present invention are not restricted to the use of algorithm 800. Any algorithm may be utilized by embodiments of the present invention that is capable of accomplishing the data list parameter function.

Thus, embodiments of the present invention provide a computer implemented method, apparatus, and computer program product for distributing data list items across multiple pages when display of the data list requires more than one page. The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for setting data list parameters for displaying a data list in pages, the computer implemented method comprising:

receiving a first and second user input, wherein the first user input defines a number of items displayed within a page, and wherein the second user input defines a page size tolerance;

responsive to receiving the first and second user input, setting the number of items displayed within the page and the page size tolerance to form a set number of items displayed within the page and a set page size tolerance; and displaying the data list in a graphical user interface according to the set number of items displayed within the page and the set page size tolerance, the data list displayed in a plurality of pages including at least one full page, each full page having at least the set number of items and no page having fewer data items than the page size tolerance, the set number of items being exceeded on at least one full page when a remaining number of data items is less than the page size tolerance.

2. The computer implemented method of claim 1, further comprising:
receiving a third user input, wherein the third user input enables a behavior, and wherein the behavior is at least one of a maximized, normalized, and user specified behavior, and wherein the maximized, normalized, and user specified behavior determines how to aggregate extra data list items from a last page.

3. The computer implemented method of claim 2, further comprising:
receiving a fourth user input, wherein the fourth user input is received only when the third user input enables the user specified behavior, and wherein the fourth user input defines a number of pages across which the extra data list items from the last page are aggregated.

4. The computer implemented method of claim 3, wherein the user specified behavior aggregates the extra data list items from the last page evenly across a user specified number of previously full pages as defined by the fourth user input.

5. The computer implemented method of claim 2, wherein the maximized behavior aggregates the extra data list items from the last page to a previously full page up to a maximum page size tolerance limit in reverse sequential page order.

6. The computer implemented method of claim 2, wherein the normalized behavior aggregates the extra data list items from the last page to one or more previously full pages evenly up to a maximum page size tolerance limit in reverse sequential page order.

7. The computer implemented method of claim 1, further comprising:
receiving a request from a user to display the data list in pages in the graphical user interface; and
responsive to receiving the request from the user to display the data list, displaying a data list preference setting window.

8. The computer implemented method of claim 1, wherein the set number of items displayed within the page defines a number of data list items displayed per page, and wherein the set page size tolerance defines the number of data list items displayed on a last page, and wherein the number of data list items displayed on the last page cannot be equal to or less than the set page size tolerance.

9. The computer implemented method of claim 8, wherein the set page size tolerance also defines an amount of page size increase, and wherein the amount of page size increase is used for aggregation of extra data list items from the last page when the number of data list items on the last page is equal to or less than the set page size tolerance.

10. The computer implemented method of claim 1, wherein displaying the data list in the graphical user interface is defined by an algorithm, and wherein a software programmer locates the algorithm within an application program.

11. The computer implemented method of claim 1, wherein the number of items displayed within the page is defined by a page size range, and wherein the page size range includes an inherent page size tolerance, and wherein the inherent page size tolerance determines a minimum number of data list items displayed on a last page.

12. The computer implemented method of claim 1, wherein the number of items displayed within the page and page size tolerance are determined by physical pixels.

13. The computer implemented method of claim 1, wherein the receiving, setting, and displaying steps are performed by an application program.

14. The computer implemented method of claim 1, wherein the number of items displayed within the page is divided into a total number of data list items to be displayed in order to determine a total number of pages to be displayed for the total number of data list items on the graphical user interface.

15. A data processing system for setting data list parameters for displaying a data list in pages, comprising:
a bus system;
a storage device connected to the bus system, wherein the storage device includes computer usable program code; and
a processing unit connected to the bus system, wherein the processing unit executes the computer usable program code to receive a first and second user input, and wherein the first user input defines a number of items displayed within a page, and wherein the second user input defines a page size tolerance; set the number of items displayed within the page and the page size tolerance to form a set number of items displayed within the page and a set page size tolerance in response to receiving the first and second user input; and display the data list in a graphical user interface according to the set number of items displayed within the page and the set page size tolerance, the data list displayed in a plurality of pages including at least one full page, each full page having at least the set number of items and no page having fewer data items than the page size tolerance, the set number of items being exceeded on at least one full page when a remaining number of data items is less than the page size tolerance.

16. The data processing system of claim 15, wherein the set number of items displayed within the page defines a number of data list items displayed per page, and wherein the set page size tolerance defines the number of data list items displayed on a last page, and wherein the number of data list items displayed on the last page cannot be equal to or less than the set page size tolerance.

17. A computer program product for setting data list parameters for displaying a data list in pages, the computer program product comprising:
a computer readable medium having computer readable program code embodied therein, the computer readable medium comprising:
computer readable program code configured to receive a first and second user input, wherein the first user input defines a number of items displayed within a page, and wherein the second user input defines a page size tolerance;
computer readable program code configured to set the number of items displayed within the page and the page size tolerance to form a set number of items displayed within the page and a set page size tolerance in response to receiving the first and second user input; and
computer readable program code configured to display the data list in a graphical user interface according to the set number of items displayed within the page and the set page size tolerance, the data list displayed in a plurality of pages including at least one full page, each full page having at least the set number of items and no page having fewer data items than the page size tolerance, the set number of items being exceeded on at least one full page when a remaining number of data items is less than the page size tolerance.

18. The computer program product of claim 17, further comprising:
  computer readable program code configured to receive a third user input, wherein the third user input enables a behavior, and wherein the behavior is at least one of a maximized, normalized, and user specified behavior, and wherein the maximized, normalized, and user specified behavior determines how to aggregate extra data list items from a last page.

19. The computer program product of claim 18, further comprising:
  computer readable program code configured to receive a fourth user input, wherein the fourth user input is received only when the third user input enables the user specified behavior, and wherein the fourth user input defines a number of pages across which the extra data list items from the last page are aggregated.

20. The computer program product of claim 17, further comprising:
  computer readable program code configured to receive a request from a user to display the data list in pages in the graphical user interface; and
  computer readable program code configured to display a data list preference setting window in response to receiving the request from the user to display the data list.

* * * * *